US008910618B2

(12) United States Patent
Tanaka

(10) Patent No.: US 8,910,618 B2
(45) Date of Patent: Dec. 16, 2014

(54) REFLUX STRUCTURE FOR BLOW-BY GAS

(71) Applicant: Suzuki Motor Corporation, Hamamatsu-shi, Shizuoka (JP)

(72) Inventor: Koichi Tanaka, Hamamatsu (JP)

(73) Assignee: Suzuki Motor Corporation, Shizuoka (JP)

( * ) Notice: Subject to any disclaimer, the term of this patent is extended or adjusted under 35 U.S.C. 154(b) by 0 days.

(21) Appl. No.: 13/895,687

(22) Filed: May 16, 2013

(65) Prior Publication Data

US 2013/0306044 A1    Nov. 21, 2013

(51) Int. Cl.
| F02B 25/06 | (2006.01) |
| F02M 35/02 | (2006.01) |
| F02M 25/06 | (2006.01) |
| F02M 35/16 | (2006.01) |
| F02M 35/10 | (2006.01) |

(52) U.S. Cl.
CPC ........... *F02M 25/06* (2013.01); *F02M 35/0207* (2013.01); *F02M 35/162* (2013.01); *F02M 35/10222* (2013.01); *Y02T 10/121* (2013.01)
USPC .......................................................... 123/572

(58) Field of Classification Search
CPC ... F01M 13/00; F01M 13/0033; F01M 13/02; F01M 13/021; F01M 13/022; F01M 13/023; F01M 13/025; F01M 13/028
USPC .............. 123/572–573, 41.86, 198 E, 184.24, 123/184.34, 184.42, 184.47; 55/385.3; 180/219
See application file for complete search history.

(56) References Cited

U.S. PATENT DOCUMENTS

| 3,172,399 | A  | * | 3/1965  | Lentz et al. ................... 123/572 |
| 3,277,876 | A  | * | 10/1966 | Manfred Abts .............. 123/572 |
| 6,425,451 | B2 | * | 7/2002  | Yoshida et al. ............... 180/219 |
| 6,886,532 | B2 | * | 5/2005  | Nohara et al. ................ 123/401 |
| 7,246,611 | B2 | * | 7/2007  | Mashiko ....................... 123/572 |
| 7,827,973 | B2 | * | 11/2010 | Vichinsky ..................... 123/572 |
| 2001/0050193 | A1 | | 12/2001 | Yoshida et al. |
| 2002/0088444 | A1 | | 7/2002  | Mashiko |
| 2002/0129780 | A1 | | 9/2002  | Nohara et al. |
| 2008/0099001 | A1 | | 5/2008  | Vichinsky |
| 2013/0255237 | A1 | * | 10/2013 | Maehara et al. ................ 60/299 |

FOREIGN PATENT DOCUMENTS

| DE | 101 08 771   | 9/2001  |
| EP | 1 241 345    | 9/2002  |
| EP | 1 681 460    | 7/2006  |
| JP | 59-206609 A  | 11/1984 |

OTHER PUBLICATIONS

European Search Report dated Jul. 16, 2014, which issued during prosecution of European Application No. 13165674.6.

* cited by examiner

*Primary Examiner* — Hung Q Nguyen
(74) *Attorney, Agent, or Firm* — Troutman Sanders LLP

(57) ABSTRACT

A reflux structure for blow-by gas that returns blow-by gas generated in an engine to a clean side of an air cleaner to reflux the blow-by gas to the engine, the reflux structure for blow-by gas includes: a communication pipe that has a flow path introducing the blow-by gas from the engine to the clean side of the air cleaner; and an air funnel that is mounted on the clean side of the air cleaner and introduces intake air from a dirty side into the engine, wherein the communication pipe has a discharge port formed to discharge the blow-by gas to a side closer to a bottom than to an umbrella part of the air funnel around the air funnel.

5 Claims, 8 Drawing Sheets

SECTION I-I

REFLUX STRUCTURE FOR BLOW-BY GAS

CROSS-REFERENCE TO RELATED APPLICATIONS

This application is based upon and claims the benefit of priority of the prior Japanese Patent Application No. 2012-112116, filed on May 16, 2012, the entire contents of which are incorporated herein by reference.

BACKGROUND OF THE INVENTION

1. Field of the Invention

The present invention relates to a reflux structure for blow-by gas that returns blow-by gas (uncombusted gas) in an engine to a clean side of an air cleaner to reflux the blow-by gas to the engine.

2. Description of the Related Art

In an engine of a motorcycle, the blow-by gas leaking from a gap between a piston and a cylinder is refluxed to an intake system of the engine and recombusted to prevent air pollution (see, for example, Patent Document 1). As the reflux structure, there is proposed a reflux structure in which a partition wall is provided in the air cleaner to form a breather chamber. To the breather chamber of the air cleaner, an engine case is connected via a breather hose. The blow-by gas generated in the engine flows into the breather chamber of the air cleaner via the breather hose. Then, the blow-by gas is inflated in the breather chamber to be decreased in flow velocity and then mixed with intake air flowing into the clean side, and the mixture is sent from an air funnel to a combustion chamber of the engine.

[Patent Document 1] Japanese Laid-open Patent Publication No. 59-206609

Incidentally, when the capacity of the breather chamber is decreased, the pressure loss in a path of the blow-by gas increases to increase the resistance acting on the piston, resulting in decreased engine power. On the other hand, when a sufficient capacity is ensured for the breather chamber in order to avoid the engine resistance, the intake amount from the air cleaner is reduced, resulting in decreased engine power. Since there is a trade-off relationship between the capacity of the breather chamber in the air cleaner and the engine resistance as described above, the engine power is hard to increase. Further, in a multi-cylinder engine, a large amount of blow-by gas is taken into the air funnel closest to the breather chamber because of the arrangement of the breather chamber, so that there is deviation in intake amount of the blow-by gas among cylinders.

SUMMARY OF THE INVENTION

The present invention has been made in consideration of the above point, and its object is to provide a reflux structure for blow-by gas capable of appropriately adjusting the concentration of the blow-by gas in intake air and refluxing the blow-by gas without decreasing the engine power.

A reflux structure for blow-by gas of the present invention is a reflux structure for blow-by gas that returns blow-by gas generated in an engine to a clean side of an air cleaner to reflux the blow-by gas to the engine, the reflux structure for blow-by gas including: a pipe that has a flow path introducing the blow-by gas from the engine to the clean side of the air cleaner; and an air funnel that is mounted on the clean side of the air cleaner and introduces intake air from a dirty side into the engine, wherein the pipe has a discharge port formed to discharge the blow-by gas to a side closer to a bottom than to an umbrella part of the air funnel around the air funnel.

According to this configuration, the blow-by gas is discharged to the side closer to the bottom than to the umbrella part of the air funnel and then drawn into the intake flow at a high flow velocity in the vicinity of a suction port of the air funnel and refluxed to the engine. In this event, since the flow velocity on the side closer to the bottom than to the umbrella of the air funnel is lower than that in the vicinity of the suction port, the blow-by gas can be mixed with the intake air over time. Accordingly, the concentration of the blow-by gas in the intake air to be sent out to the engine can be decreased to stabilize the A/F value (air-fuel ratio).

Further, since there is no need to newly form the breather chamber on the clean side of the air cleaner, it is possible to suppress an increase in engine resistance while ensuring a sufficient capacity of the air cleaner, thereby improving the engine power.

Further, in the reflux structure for blow-by gas of the present invention, the umbrella part of the air funnel has a shape turnover from a tip side of a cylindrical funnel body to be opposed to an outer peripheral surface of the funnel body, and the discharge port of the pipe is positioned on an inside of the umbrella part to be covered with the umbrella part of the air funnel.

According to this configuration, the blow-by gas is discharged to the inside of the umbrella part and diffused along the inner peripheral surface of the umbrella part. This is effective in the case where the discharge amount of the blow-by gas is large because the blow-by gas is more likely to be mixed with the intake air. Further, the wall surface of the air funnel is cooled at all times by the intake air, so that the gas/liquid separation effect to the blow-by gas discharged to the inside of the umbrella part can be enhanced. In this event, since the flow velocity of the intake air is high inside the funnel body and is lower in surface temperature than the umbrella part, the blow-by gas is likely to be liquidized. Accordingly, an oil component of the blow-by gas is allowed to adhere to the wall surface of the funnel body to separate a gas component to the umbrella part side.

Further, in the reflux structure for blow-by gas of the present invention, the engine is a multi-cylinder engine that includes the air cleaner having a plurality of the air funnels, and the pipe is disposed between adjacent ones of the air funnels.

According to this configuration, it is possible to allow the blow-by gas to be evenly taken into the plurality of air funnels by using one pipe. Thus, it is possible to suppress variations in the A/F value among plurality of cylinders to improve the engine efficiency. Further, as compared with the configuration in which the pipe is provided for each cylinder, the number of parts and cost can be reduced as well as the increase in weight can be suppressed.

Further, in the reflux structure for blow-by gas of the present invention, in the air cleaner, a fuel injection device is provided on an upper surface opposed to a mounting surface for the air funnel, the pipe is composed of a breather pipe that connects the engine and the air cleaner and a hollow column part that continues to the breather pipe and connects the mounting surface and the upper surface of the air cleaner, and the fuel injection device is fixed to a tip part of the column part.

According to this configuration, the column part to which the fuel injection device is fixed can be used also as the pipe that discharges the blow-by gas. Therefore, it is possible to utilize the inner space of the column part as the breather chamber while minimizing the reduction in capacity of the air cleaner. Further, since the upper surface and the mounting surface of the air cleaner are connected together by the column part, the surface rigidity can be improved to suppress the vibration so as to reduce the intake noise.

Further, in the reflux structure for blow-by gas of the present invention, in the air cleaner, a filter that separates the clean side and the dirty side is mounted on a front side and the plurality of air funnels are mounted on a rear side, and the column part is mounted on a rear side of the air funnel and has the discharge port formed to discharge the blow-by gas between the adjacent air funnels.

According to this configuration, the blow-by gas discharged from the discharge port passes between the air funnels and is then mixed with the intake air flowing from the filter toward the air funnels. Therefore, the inner space of the column part and the gap between the adjacent air funnels can be utilized as the breather chamber to decrease the concentration of the blow-by gas in the intake air toward the engine, thereby stabilizing the A/F value.

DETAILED DESCRIPTION OF THE PREFERRED EMBODIMENTS

Hereinafter, a first embodiment will be described in detail referring to the accompanying drawings. Note that an example in which a reflux structure for blow-by gas according to the present invention is applied to a V2 engine will be described in the first embodiment.

Figure 1:
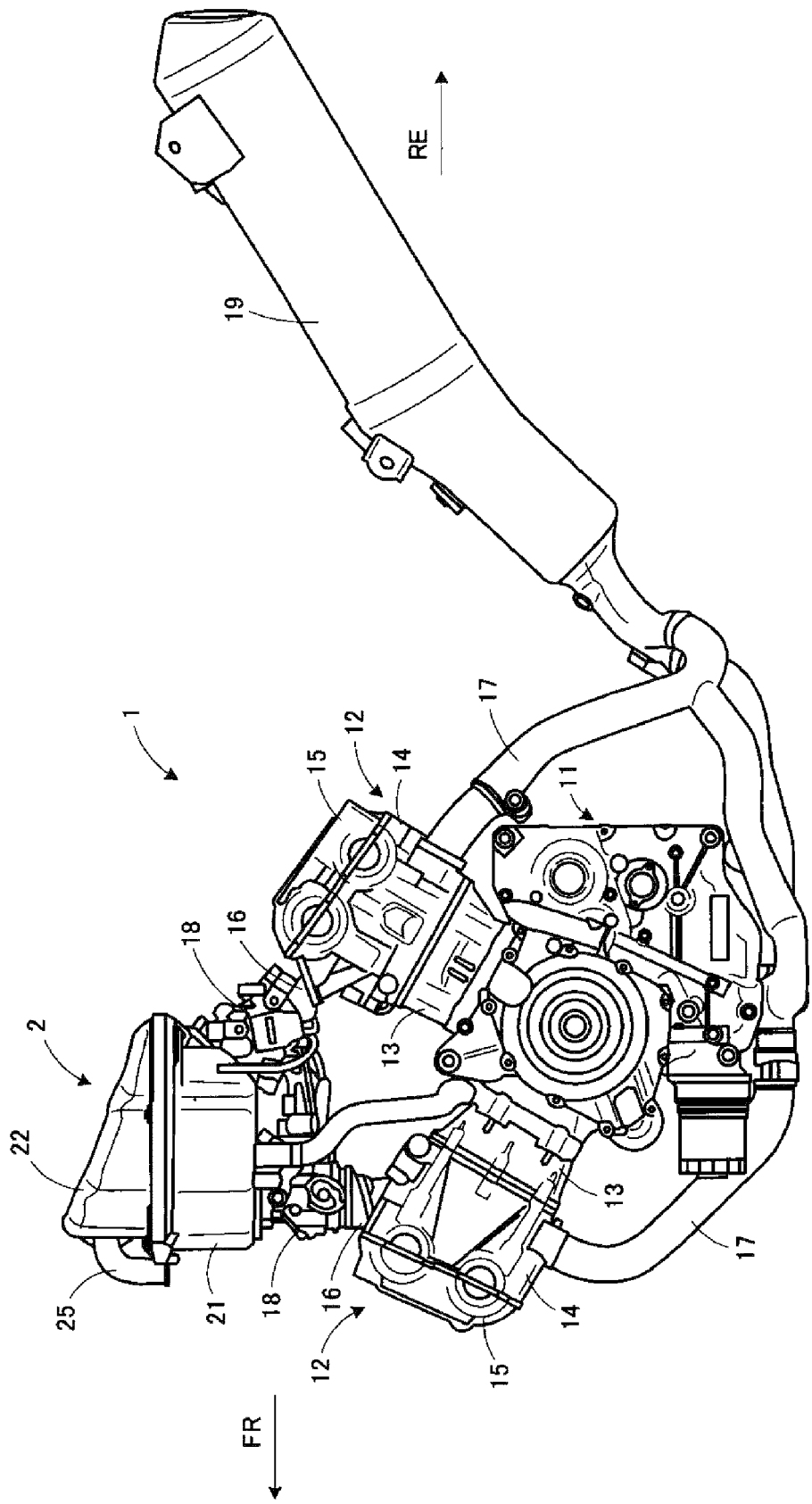
FIG. 1 is a side view of an engine according to a first embodiment of the present invention.

The outline of the engine to which the reflux structure for blow-by gas according to the first embodiment is applied will be described referring to FIG. 1. FIG. 1 is a side view of the engine according to the first embodiment. Note that the front of a vehicle is indicated by an arrow FR, the rear of the vehicle is indicated by an arrow RE, a lateral left side of the vehicle is indicated by an arrow L, and a lateral right side of the vehicle is indicated by an arrow R, respectively in the following description.

As illustrated in FIG. 1, an engine 1 is a V2 engine configured such that two front and rear cylinders 12 are arranged in a V-shaped form with respect to an engine case 11. The cylinders 12 are configured in a manner that cylinder heads 14 and head covers 15 are attached to cylinder blocks 13 disposed on the engine case 11. To each of the cylinder heads 14, an intake pipe 16 that takes air into the engine 1 and an exhaust pipe 17 that sends out exhaust gas to the outside of the engine 1 are connected. Each intake pipe 16 is connected to an air cleaner 2 via a throttle body 18 that adjusts the intake amount into the engine 1. Each exhaust pipe is connected to a muffler 19 via a collecting pipe.

The air cleaner 2 is disposed to straddle the two front and rear cylinders 12 via the throttle bodies 18 provided at the respective cylinders 12 arranged in the V-shaped form. The air cleaner 2 is divided into a dirty side 26 and a clean side 27 by a filter 24 that partitions the inside of the air cleaner 2 into upper and lower parts (see FIG. 2). A space above the filter 24 is the dirty side 26 into which outside air is taken in via a suction pipe 25 provided at the front of the upper part of the air cleaner 2. A space below the filter 24 is the clean side 27 into which outside air filtrated by the filter 24 flows from the dirty side.

The outside air flowing into the clean side 27 is adjusted in intake amount in the throttle bodies 18 and mixed with fuel injected from a fuel injection device, and then fed into combustion chambers inside the cylinders 12. The exhaust gas after combustion in the cylinders 12 passes through the exhaust pipes 17 extending from the cylinders 12 and is exhausted from the muffler 19. In the cylinders 12, pistons (not illustrated) are reciprocally moved by the combustion of the air-fuel mixture, and their motive force is transmitted to be converted into rotary movement of a crankshaft in the engine case 11. In this event, the blow-by gas leaking from the gaps between the pistons and the cylinders 12 is sent by the internal pressure of the crank case 11 from the engine case 11 to the clean side of the air cleaner 2 passing through breather hoses 3 (see FIG. 2) connected to the air cleaner 2.

On the clean side 27 of the air cleaner 2, intake air newly taken thereinto and the blow-by gas flowing thereinto from the engine case 11 are mixed together. As described above, in the reflux structure for blow-by gas, the blow-by gas is mixed with the intake air on the clean side 27, and then refluxed to and recombusted in the cylinders 12. The reflux structure for blow-by gas generally has a configuration that a breather chamber is provided for the air cleaner 2 to sufficiently reduce the flow velocity of the blow-by gas and then mix the blow-by gas with the intake air to thereby decreasing the concentration of the blow-by gas in the intake air. In this case, the breather chamber needs to ensure a capacity with which the engine resistance is not increased.

However, if the breather chamber is provided in the air cleaner 2, the capacity of the air cleaner 2 is reduced to possibly reduce the engine power. Hence, in the reflux structure for blow-by gas according to this embodiment, the blow-by gas is discharged toward the inside of umbrella parts 32 of air funnels 29 at which the intake flow is gentle, instead of provision of the breather chamber on the clean side 27. This makes it possible to decrease the concentration of the blow-by gas in the intake air without providing the breather chamber in the air cleaner 2. Hereinafter, the reflux structure for blow-by gas will be described in detail referring to FIG. 2.

Figure 2:
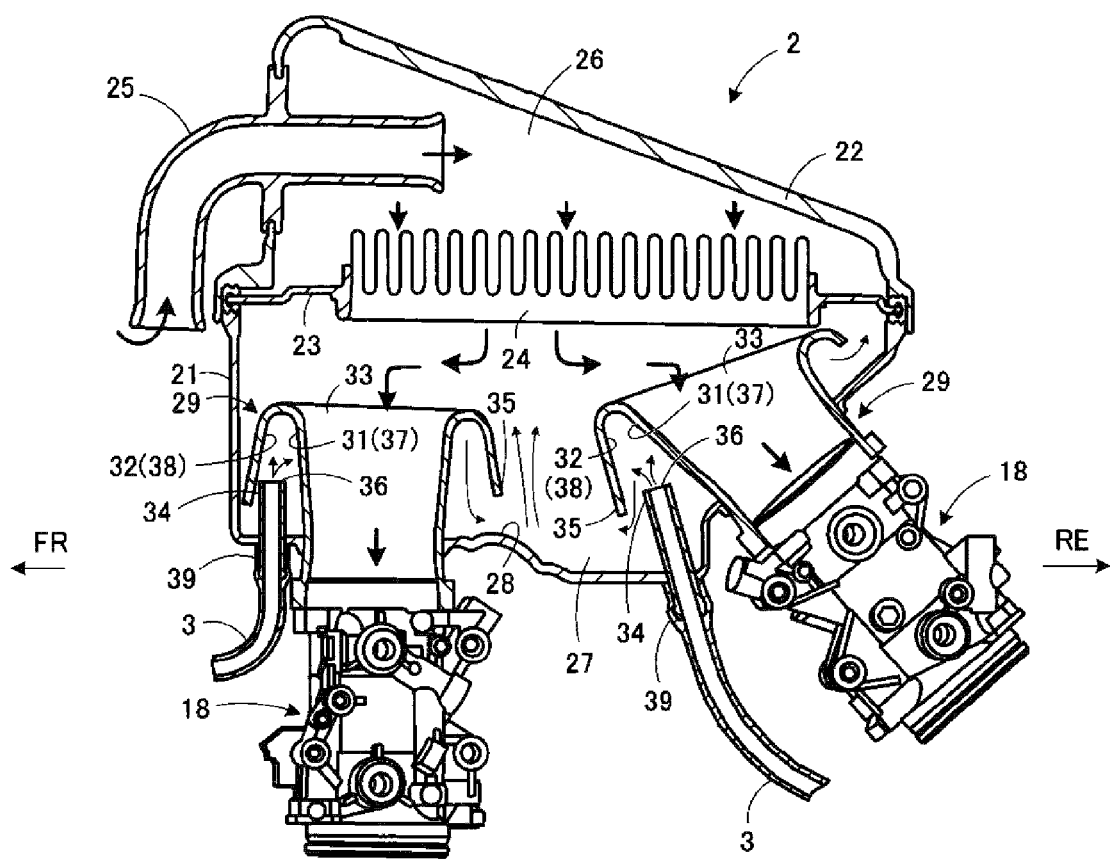
FIG. 2 is an explanatory view of a reflux structure for blow-by gas according to the first embodiment of the present invention.

FIG. 2 is an explanatory view of the reflux structure for blow-by gas according to the first embodiment. In FIG. 2, thick arrows indicate the flow of the intake air, and thin arrows indicate the flow of the blow-by gas. Note that the reflux structure for blow-by gas according to the first embodiment represents one example, and the present invention is not limited to the configuration illustrated in FIG. 2.

As illustrated in FIG. 2, the air cleaner 2 is molded of synthetic resin and configured such that an upper case 22 having a lower surface opened is attached to a lower case 21 having an upper surface opened. At a boundary part between the lower case 21 and the upper case 22, the filter 24 is attached via a filter attachment part 23 so as to partition the inside of the air cleaner 2 into upper and lower parts. At the front surface of the upper case 22, the suction pipe 25 in an almost L-shaped form that takes outside air into the air cleaner 2 is provided so that the outside air taken in through the suction pipe 25 is cleaned through the filter 24 and sent to the lower case 21 side. As described above, the upper case 22 side forms the dirty side 26, and the lower case 21 forms the clean side 27.

At a mounting surface 28 provided at the bottom surface of the lower case 21, a pair of air funnels 29 are mounted which supply the intake air to the respective cylinders. Each of the air funnels 29 has a cylindrical funnel body 31 and the umbrella part 32 continuing to the upper end side (tip side) of the funnel body 31. The funnel body 31 has a portion on the lower end side projecting to the outside of the air cleaner 2, and the throttle body 18 is connected to the projecting portion. The funnel body 31 is formed in a manner to increase in bore upward from the mounting surface 28 so as to smooth the flow of the intake air in the vicinity of a suction port 33. The umbrella part 32 has a shape turnover to be opposed to an outer peripheral surface 37 of the funnel body 31.

Around the air funnel 29, the flow velocity of the intake air increases in the vicinity of the suction port 33 of the funnel body 31 and the flow velocity of the intake air decreases under (inside) the umbrella part 32. In the vicinity of the air funnels 29, a pair of communication pipes 34 are provided which communicate the clean side 27 of the air cleaner 2 and inner flow paths of the breather hoses 3. One end side of each of the communication pipes 34 projects to the inside of the air cleaner 2 and is positioned on the inside of the umbrella part 32 of the air funnel 29. The other end side of each of the communication pipes 34 projects to the outside of the air cleaner 2 and is connected to a connection part 39 on the tip side of the breather hose 3.

Further, an open end 35 of the umbrella part 32 is located close to the mounting surface 28 due to the turnover shape in which the upper end of the funnel body 31 is the base end. A discharge port 36 on one end side of each of the communication pipes 34 is located above the open end 35 of the umbrella part 32, namely, located on the inside of the umbrella part 32. Accordingly, an outer peripheral surface of the communication pipe 34 overlaps with an inner peripheral surface 38 of the umbrella part 32, so that not only the top but also the side of the discharge port 36 of the communication pipe 34 is covered with the umbrella part 32. Accordingly, the blow-by gas discharged from the discharge port 36 of the communication pipe 34 via the breather hose 3 is diffused along the inner surface of the umbrella part 32. As described above, the space under the umbrella part 32 is utilized as the breather chamber in this embodiment.

Note that the flow path diameters of the communication pipe 34 and the breather hose 3 are ensured to have sizes with which the engine resistance is not increased due to pressure loss. This makes it possible to reduce the pressure loss in the breather path while ensuring the capacity of the air cleaner 2, thereby improving the engine power.

In the air cleaner 2 configured as described above, the blow-by gas in the engine case 11 is sent toward the clean side 27 via the breather hoses 3. The blow-by gas is discharged to the inside of the umbrella parts 32 from the discharge ports 36 of the communication pipes 34. The blow-by gas discharged to the inside of the umbrella parts 32 is diffused along the inner peripheral surfaces 38 of the umbrella parts 32 and the outer peripheral surfaces 37 of the funnel bodies 31. In this event, the flow velocity of the intake air is lower inside the umbrella parts 32 than in the vicinity of the suction ports 33 of the air funnels 29. Accordingly, the blow-by gas is diffused over time inside the umbrella parts 32 and is likely to be mixed with the air in the clean side 27.

Further, the wall surfaces of the air funnels 29 are cooled at all times by the intake flow. The flow velocity of the intake air is high inside the funnel bodies 31, and the outer peripheral surfaces 37 of the funnel bodies 31 are lower in surface temperature than the inner peripheral surfaces 38 of the umbrella parts 32. Therefore, the blow-by gas is likely to be liquidized on the outer peripheral surfaces 37 of the funnel bodies 31, and an oil component of the blow-by gas adheres to the outer peripheral surfaces 37 to facilitate separation of a gas component to the umbrella parts 32 side. As described above, the gas/liquid separation effect to the blow-by gas discharged to the inside of the umbrella parts 32 is enhanced around the air funnels 29.

The blow-by gas after being diffused inside the umbrella parts 32 flows around from the inside to the outside of the umbrella parts 32 and is drawn into the intake flow in the vicinity of the suction ports 33 and then refluxed into the engine 1. The intake air taken into the dirty side 26 is sent to the clean side 27 via the filter 24 and mixed with the blow-by gas in the vicinity of the suction ports 33. In this case, the blow-by gas is diffused over time around the air funnels 29, so that the concentration of the blow-by gas mixed with the intake air can be decreased to stabilize the A/F value (air-fuel ratio).

As described above, according to this embodiment, the blow-by gas can be discharged to the inside of the umbrella parts 32 and slowly mixed with the intake air. This makes it possible to decrease the concentration of the blow-by gas in the intake air sent out to the engine 1 to stabilize the A/F value. Further, since there is no need to newly form the breather chamber on the clean side 27 of the air cleaner 2, it is possible to suppress an increase in engine resistance while ensuring a sufficient capacity of the air cleaner 2, thereby improving the engine power.

Next, a second embodiment will be described in detail referring to the accompanying drawings. The second embodiment is different from the first embodiment in that 2nd injectors (fuel injection devices) are fixed on the air cleaner. In the second embodiment, an example in which a reflux structure for blow-by gas according to the present invention is applied to a parallel four-cylinder engine will be described.

Figure 3:
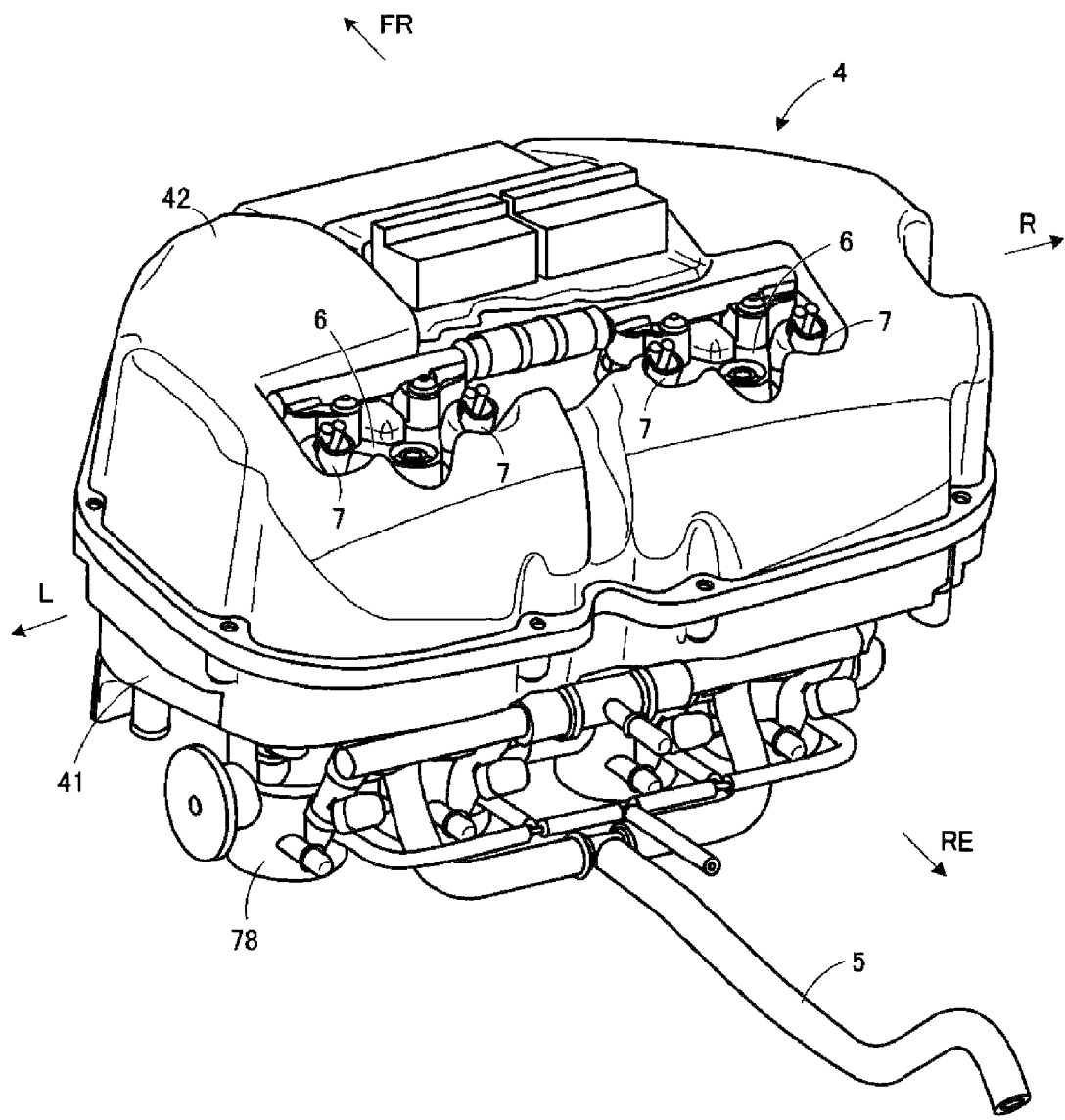
FIG. 3 is a perspective view of an air cleaner according to a second embodiment of the present invention.
Figure 4A:
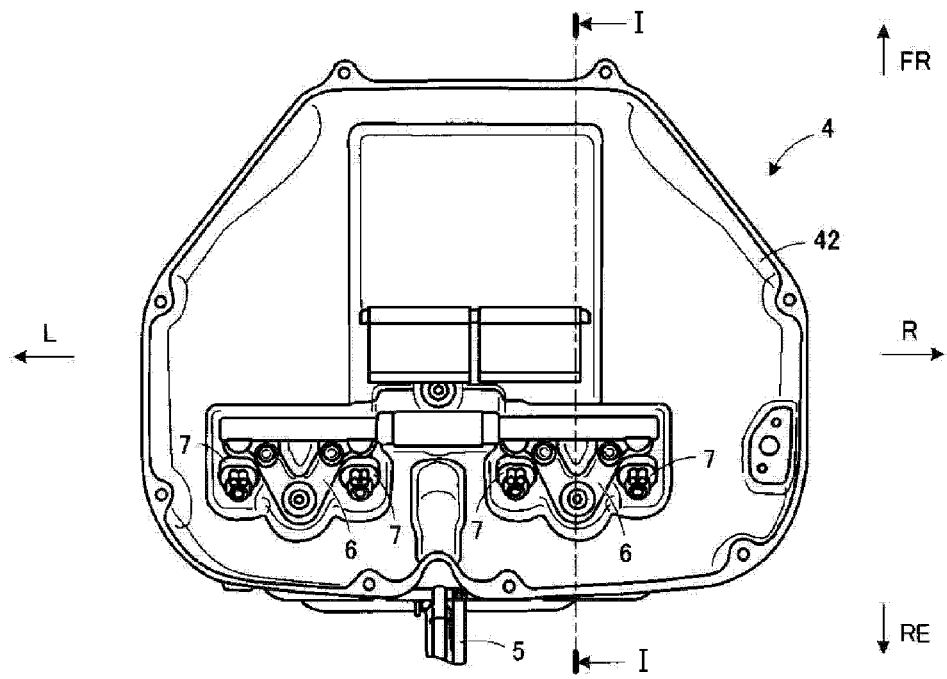
FIG. 4A is a plan view of the air cleaner according to the second embodiment of the present invention.
Figure 4B:
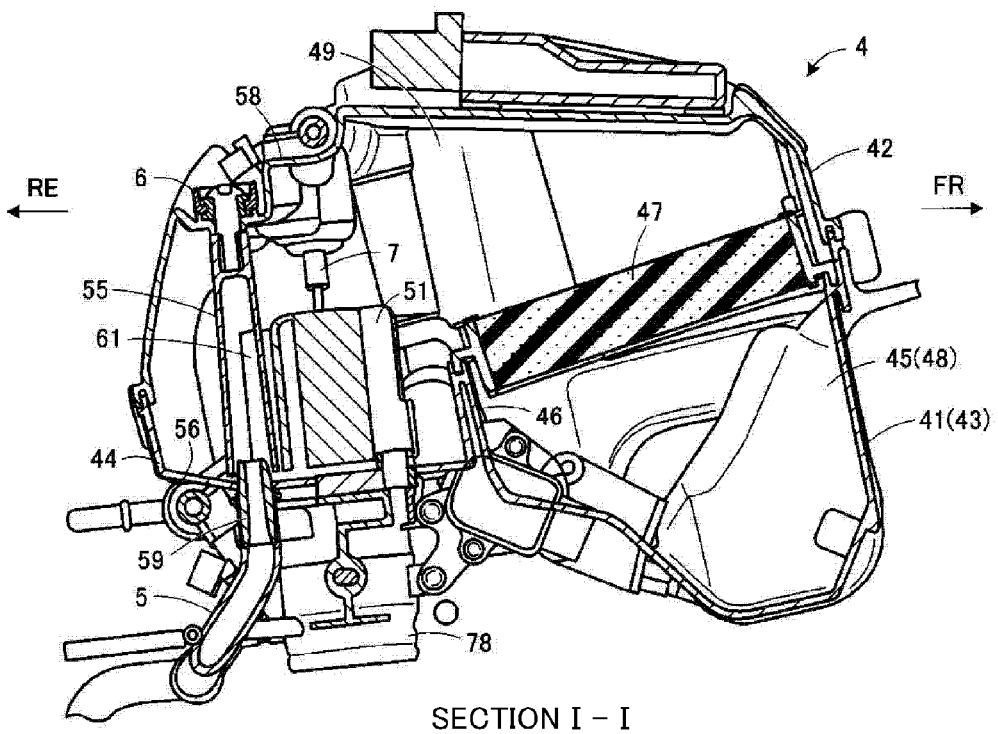
FIG. 4B is a cross-sectional view taken along a line I-I in FIG. 4A, illustrating the air cleaner according to the second embodiment of the present invention.
Figure 5A:
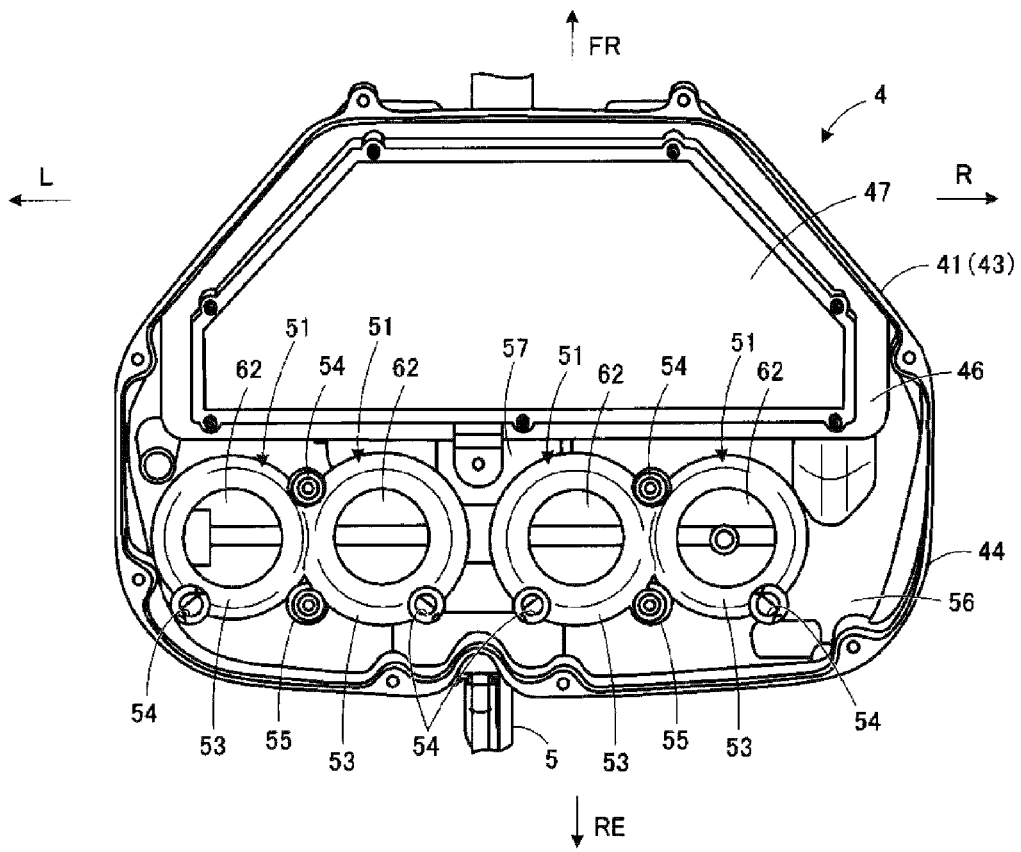
FIG. 5A is a plan view illustrating the air cleaner according to the second embodiment of the present invention with an upper case removed therefrom.
Figure 5B:
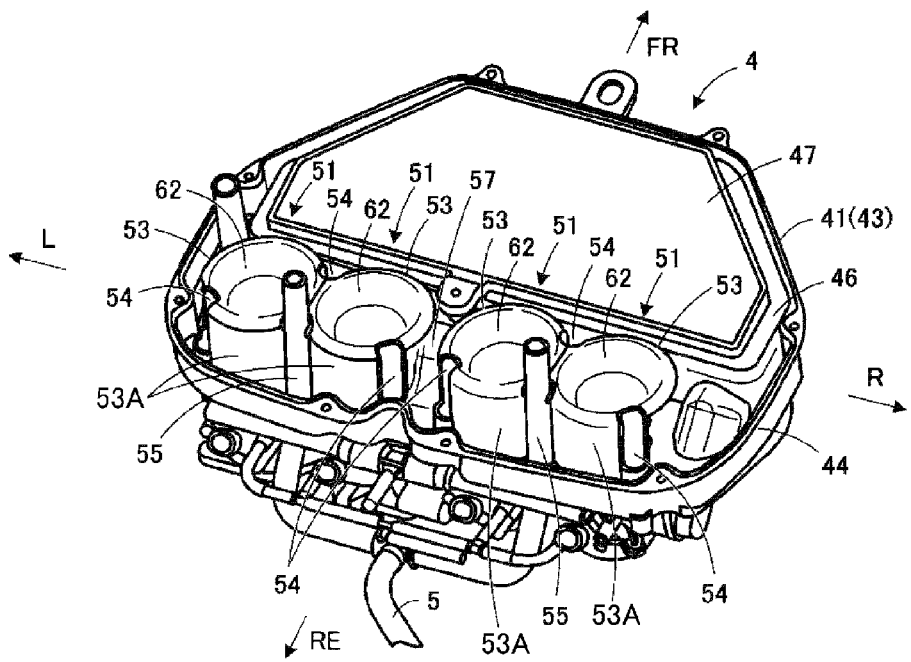
FIG. 5B is a perspective view illustrating the air cleaner according to the second embodiment of the present invention with the upper case removed therefrom.

FIG. 3 is a perspective view of an air cleaner according to the second embodiment. FIGS. 4A and 4B are a plan view and a cross-sectional view of the air cleaner according to the second embodiment. FIGS. 5A and 5B are views illustrating the air cleaner according to the second embodiment with an upper case removed therefrom. Note that FIG. 4A is a plan view of the air cleaner, and FIG. 4B is a cross-sectional view taken along a line I-I in FIG. 4A. Note that the reflux structure for blow-by gas according to the second embodiment represents one example, and the present invention is not limited to the configuration illustrated below.

As illustrated in FIG. 3 to FIGS. 5A and 5B, an air cleaner 4 is molded of synthetic resin and configured such that an upper case 42 having a lower surface opened is attached to a lower case 41 having an upper surface opened. To the lower case 41, a breather hose 5 extending from the engine case is connected. The breather hose 5 is bifurcated at its middle so as to be connected to both right and left sides of the lower case 41. At the upper surface of the upper case 42, an opening part is formed, and upper end portions of later-described column parts 55 are in contact with the periphery of the opening part. To the upper end portions of the column parts 55, fixtures 6 are screwed through the opening part, and four 2nd injectors 7 are fixed by the fixtures 6.

The 2nd injectors 7 inject fuel inside the air cleaner 4 to decrease the temperature of the intake air for better mixture of injected fuel to increase the engine power. The 2nd injectors 7 are arranged upstream of throttle valves and inject fuel to the intake air in conjunction with 1st injectors (not illustrated) arranged downstream of the throttle valves.

An almost front half part 43 of the lower case 41 bulges downward to form an outside air introduction chamber 45. To the outside air introduction chamber 45, outside air is introduced via a pair of right and left intake ducts (not illustrated) provided at the lower case 41. In the lower case 41, a partition wall 46 is provided to surround the outside air introduction chamber 45. To the partition wall 46, a filter 47 is attached to cover the top of the outside air introduction chamber 45. The intake air flowing from the outside air introduction chamber 45 is cleaned through the filter 47. As described above, the inside of the air cleaner 4 is divided by the filter 47 into a dirty side 48 and a clean side 49.

In an almost rear half part 44 of the lower case 41, four air funnels 51 are attached which supply intake air to respective cylinders of the engine. The four air funnels 51 are molded such that a pair of air funnels 51 located in an almost left half part are integrally molded and a pair of air funnels 51 located in an almost right half part are integrally molded. Each of the air funnels 51 has a cylindrical funnel body 52 and an umbrella part 53 continuing to an upper end side (tip side) of the funnel body 52. Further, the umbrella parts 53 of the pair of air funnels 51 are integrally molded with three funnel fastening parts 54 into which fixing bolts are inserted and a vertically extending column part 55.

The funnel body 52 has a portion on the lower side projecting to the outside of the lower case 41, and a throttle body 78 is connected to the projecting portion. The funnel body 52 is formed in a manner to increase in bore upward from a mounting surface 56 so as to smooth the flow of the intake air in the vicinity of a suction port 62. The umbrella part 53 has a shape turnover to be opposed to the funnel body 52. The umbrella part 53 is formed to be long on the rear side of the air funnel 51 so as to cover the rear of the air funnel 51 (see FIG. 6B, this part is defined as a skirt part 53A), while formed to be short on the front side of the air funnel 51 so as to open the front of the air funnel 51. Further, between the pair of air funnels 51, a flow path for the blow-by gas is formed by the umbrella parts 53 and the funnel bodies 52.

The funnel fastening part 54 is provided at the middle on the front side of the pair of air funnels 51, and the funnel fastening parts 54 are provided at both right and left sides on the rear side of the pair of air funnels 51. In this case, a bulging part 57 is formed by a motor of the throttle body is formed in the lower case 41, and the funnel fastening parts 54 are arranged in a balanced manner to avoid the bulging part 57. The column part 55 is provided at a position between the pair of air funnels 51 where the funnel fastening part 54 is not formed, namely, at the middle on the rear side of the pair of air funnels 51. As described above, in the air cleaner 4 according to this embodiment, the arrangement of the funnel fastening parts 54 and the column parts 55 is decided depending on the bulging part 57 formed in the lower case 41.

The column parts 55 are formed in a hollow cylindrical shape and connect the mounting surface 56 of the lower case 41 and the upper surface 58 of the upper case 42 to improve the surface rigidity. Therefore, the vibration at the mounting surface 56 and the upper surface 58 of the air cleaner 4 is suppressed to reduce the intake noise. The column parts 55 are in contact with the upper surface 58 of the upper case 42 and screwed to the fixtures 6 in the V-shaped form in a top view on the upper case 42. Each of the column parts 55 fixes the pair of injectors 7 via the fixture 6. The 2nd injectors 7 are supported at the tips of the fixture 6 in the V-shaped form respectively, and positioned above the air funnels 51 via the opening formed in the upper case 42.

Further, directly under the column parts 55, communication pipes 59 are provided which communicate inner spaces of the column parts 55 and the inner flow path of the breather hose 5. One end side of each of the communication pipes 59 projects to the inside of the air cleaner 4 and is accommodated inside the column part 55. The other end side of each of the communication pipes 59 projects to the outside of the air cleaner 4 and is connected to the tip side of the breather hose 5. On the side surface of each of the column parts 55, a discharge port 61 (see FIG. 4B, FIG. 6A) is formed to discharge the blow-by gas sent from the breather hose 5 to a gap between the pair of air funnels 51.

Figure 6A:
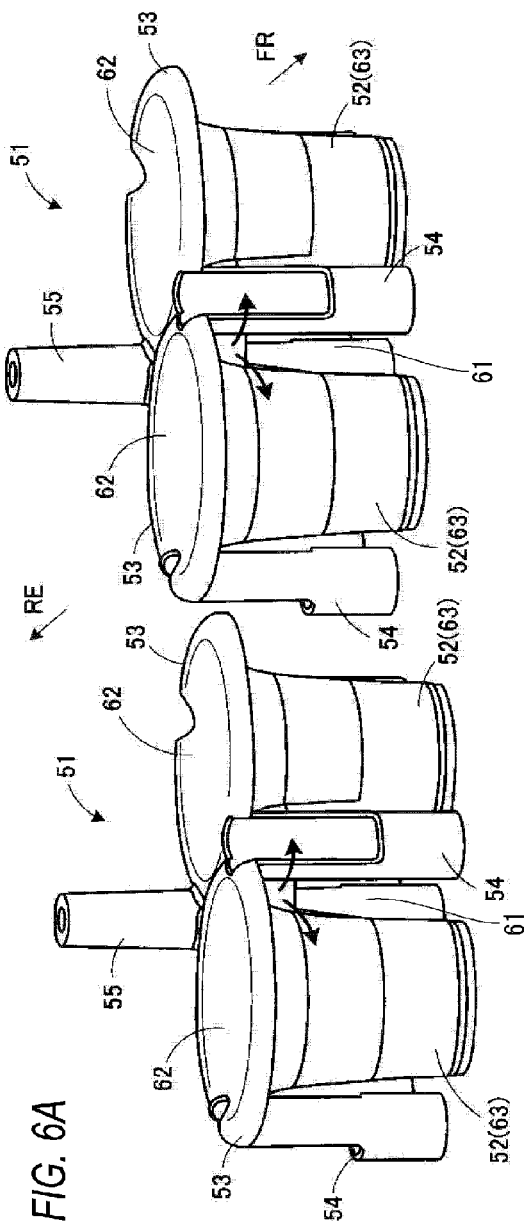
FIG. 6A is a front perspective view of air funnels according to the second embodiment of the present invention.
Figure 6B:
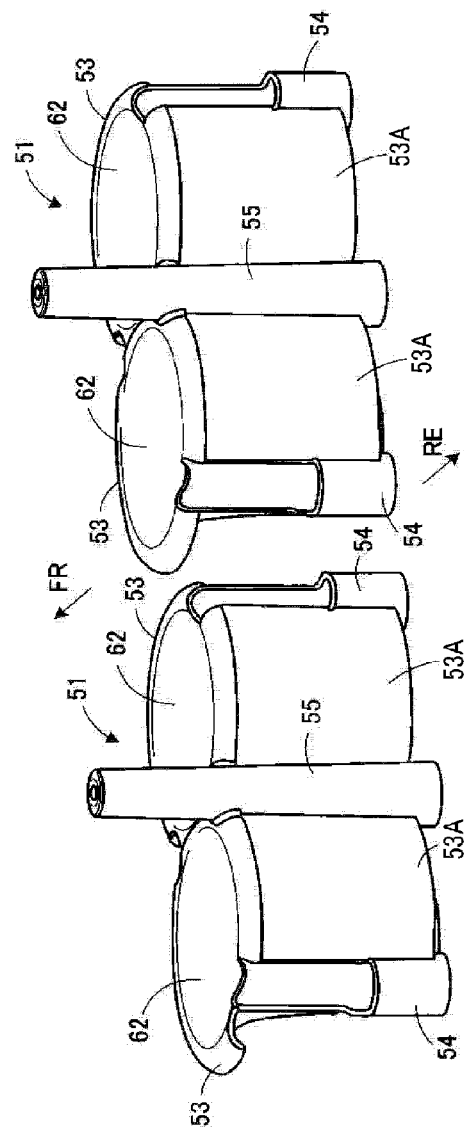
FIG. 6B is a rear perspective view of the air funnels according to the second embodiment.

The detailed configuration of the air funnels will be described referring to FIGS. 6A and 6B. FIGS. 6A and 6B are perspective views of the air funnels according to the second embodiment. Note that FIG. 6A is a perspective view of the air funnels as seen from the front, and FIG. 6B is a perspective view of the air funnels as seen from the rear.

As illustrated in FIGS. 6A and 6B, the pair of air funnels 51 are adjacently arranged and continuous via the umbrella parts 53. At the middle on the front side and at both right and left sides on the rear side of the pair of air funnels 51, the funnel fastening parts 54 are provided. Further, at the middle on the rear side of the pair of air funnels 51, the hollow column part 55 is provided. The funnel fastening parts 54 on the rear side of the pair of air funnels 51 and the column part 55 are coupled together by rear portions (skirt parts 53A) of the umbrella parts 53 extending to the vicinity of the mounting surface 56. The rear portions of the umbrella parts 53 suppress entrance of the blow-by gas into the suction ports 62 from the rear of the pair of air funnels 51.

In the outer peripheral surface of the column part 55, the discharge port 61 opened toward the front is formed. The blow-by gas discharged from the discharge port 61 is sent to the filter 47 side passing through the gap between the pair of air funnels 51. In this event, around the air funnel 51, the flow velocity of the intake air increases in the vicinity of the suction port 62 of the funnel body 52 and the flow velocity of the intake air decreases between the pair of air funnels 51. Accordingly, the blow-by gas is diffused during the time when it flows from the inner space of the column part 55 and passes through the gap between the pair of air funnels 51 toward the filter 47 side. As described above, the inner space of the column part 55 and the gap between the pair of air funnels 51 are utilized as the breather chamber in this embodiment.

Front portions of the umbrella parts 53 are formed such that the front surfaces are opened to facilitate sending of the blow-by gas from the gap between the pair of air funnels 51. At the front portions of the umbrella parts 53, the blow-by gas flows toward the filter 47 from the gap between the funnel fastening part 54 located on the front side and the pair of funnel bodies 52, and drawn into the intake flow from the filter 47 and refluxed to the engine. In this case, the blow-by gas is sent out from between the pair of air funnels 51 and is therefore evenly mixed with the intake air flowing toward the pair of air funnels 51. Accordingly, as compared with the configuration in which the column part 55, the breather hose 5 and the like are provided for the individual air funnel 51, the number of parts and cost can be reduced as well as the increase in weight can be suppressed.

Note that the flow path diameters of the communication pipe 59, the breather hose 5 and the column part 55 are ensured to have sizes with which the engine resistance is not increased due to pressure loss. This makes it possible to reduce the pressure loss in the breather path while ensuring the capacity of the air cleaner 4, thereby improving the engine power.

Figure 7A:
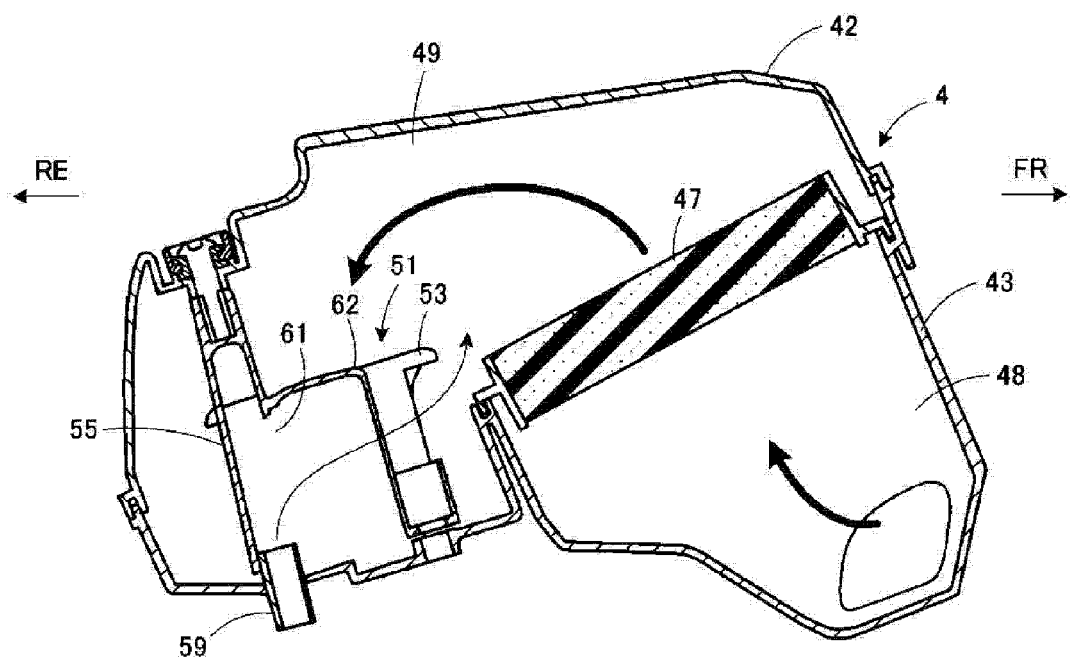
FIG. 7A is a cross-sectional view explaining the flow of the blow-by gas in the air cleaner according to the second embodiment of the present invention.
Figure 7B:
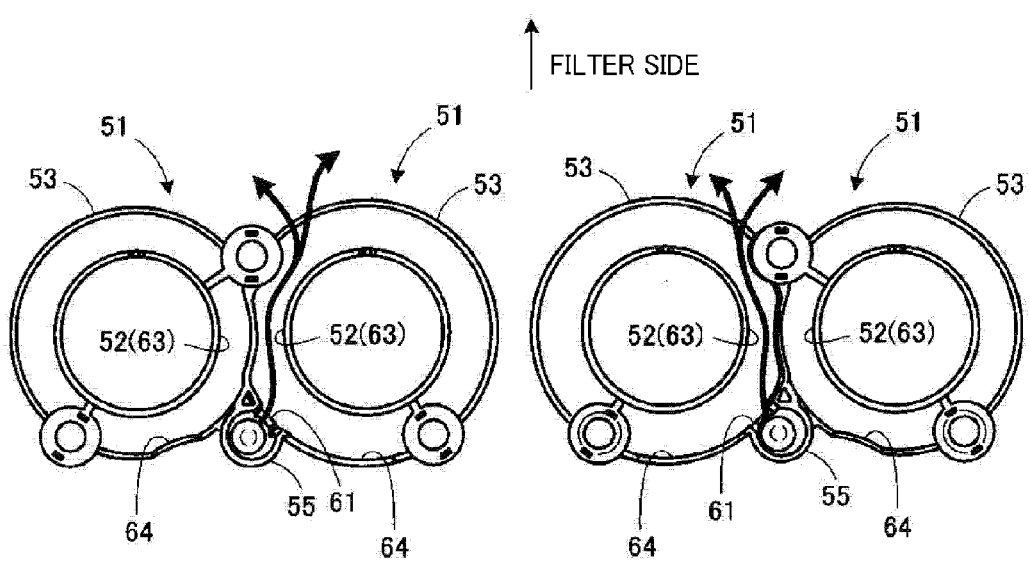
FIG. 7B is a plan view explaining the flow of the blow-by gas in the air cleaner according to the second embodiment of the present invention.

The reflux of the blow-by gas inside the air cleaner will be described referring to FIGS. 7A and 7B. FIGS. 7A and 7B are explanatory views of the flow of the blow-by gas inside the air cleaner according to the second embodiment. Note that FIG. 7A illustrates the flow of the blow-by gas as seen from the cross-section of the air cleaner, and FIG. 7B illustrates the flow of the blow-by gas when the air funnels are seen from below. Further, a part of the air cleaner is omitted for convenience of explanation in FIGS. 7A and 7B.

As illustrated in FIGS. 7A and 7B, the blow-by gas inside the engine case is sent toward the clean side 49 via the breather hose 5. The blow-by gas is sent from the communication pipes 59 to the hollow column parts 55, and discharged from the discharge ports 61 of the column parts 55 toward the filter 47 side. The blow-by gas discharged from the discharge ports 61 passes between the adjacent air funnels 51 and is sent to the front after passing under the umbrella parts 53. In this event, the flow velocity of the intake air is lower under the umbrella parts 53 than in the vicinity of the suction ports 62 of the air funnels 51. Accordingly, the blow-by gas is diffused over time in the space where the pair of air funnels 51 are opposed to each other and is likely to be mixed with the air in the clean side 49.

Further, the wall surfaces of the air funnels 51 are cooled at all times by the intake flow. The flow velocity of the intake air is high inside the funnel bodies 52, and outer peripheral surfaces 63 of the funnel bodies 52 are lower in surface temperature than inner peripheral surfaces 64 of the umbrella parts 53. Therefore, the blow-by gas is likely to be liquidized on the outer peripheral surfaces 63 of the funnel bodies 52, and an oil component of the blow-by gas adheres to the outer peripheral surfaces 63 to facilitate separation of a gas component to the umbrella parts 53 side. As described above, the gas/liquid separation effect to the blow-by gas discharged to the inside of the umbrella parts 53 is enhanced around the air funnels 51.

The blow-by gas passes between the pair of air funnels 51 and flows to the front side of the air funnels 51, and is then mixed with the intake air flowing from the filter 47 toward the air funnels 51. In this case, the blow-by gas passes through the middle between the pair of air funnels 51 and is then mixed with the intake air, and is therefore evenly taken into the pair of air funnels 51. This suppresses variations in the A/F value to stabilize the combustion state of the engine to improve the engine efficiency. Further, the blow-by gas is diffused over time between the pair of air funnels 51, so that the concentration of the blow-by gas mixed with the intake air can be decreased to stabilize the A/F value.

As described above, according to this embodiment, it is possible to decrease the concentration of the blow-by gas in the intake air sent out to the engine to stabilize the A/F value as in the first embodiment. Further, the inner space of the column part 55 supporting the 2nd injectors 7 and the gap between the air funnels 51 can be utilized as the breather chamber. Accordingly, it is possible to suppress an increase in engine resistance while ensuring a sufficient capacity of the air cleaner 4, thereby improving the engine power. Further, since the upper surface 58 and the mounting surface 56 of the air cleaner 4 are connected by the column parts 55, the surface rigidity can be improved to suppress the vibration so as to reduce the intake noise.

As above, the respective embodiments of the present invention have been described in detail with reference to the drawings, but, the present invention is not limited to the above-described respective embodiments, and can be implemented while being variously modified. In the above-described respective embodiments, a size, a shape and the like illustrated in the accompanying drawings are not limited to the illustrated ones, and can be appropriately modified within a range of exerting the effect of the present invention. Additionally, the present invention can be implemented while being appropriately modified without departing from the scope of the present invention.

Figure 8A:
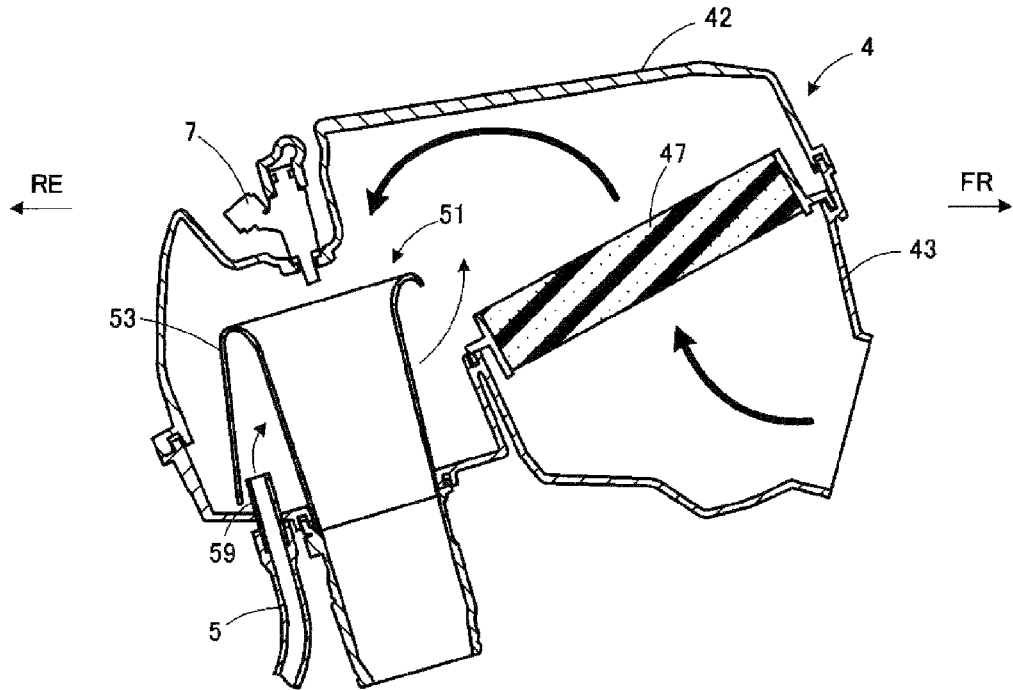
FIG. 8A is an explanatory view of the flow of the blow-by gas in an air cleaner according to a modification example of the present invention.
Figure 8B:
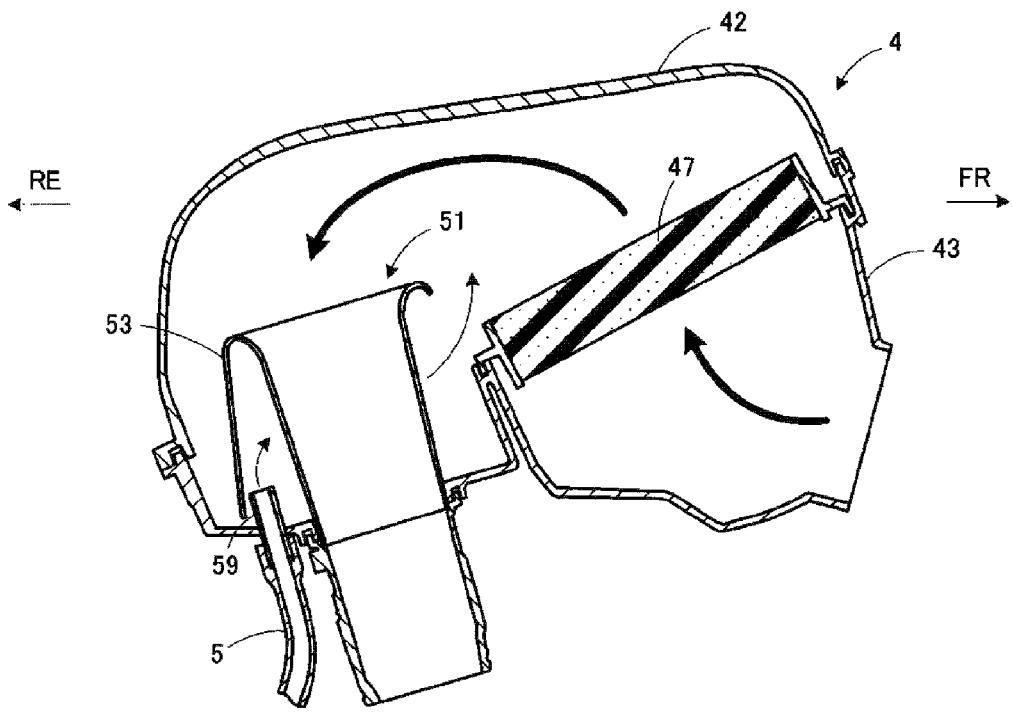
FIG. 8B is an explanatory view of the flow of the blow-by gas in an air cleaner according to another modification example of the present invention.

For example, the 2nd injectors 7 are configured to be supported by the column parts 55 in the air cleaner 4 in the second embodiment, but the present invention is not limited to this configuration. As illustrated in FIG. 8A, the injector 7 may be configured to be supported by the upper case 42 of the air cleaner 4. In this case, the communication pipe 59 provided at the air cleaner 4 may be configured to project to the inside of the umbrella part 53 of the air funnel 51 and the inside of the umbrella part 53 is utilized as the breather chamber. Further, the air cleaner 4 may be configured to have no 2nd injector 7 as illustrated in FIG. 8B.

Further, the blow-by gas is discharged to the inside of the umbrella part 32 from the discharge port 36 of the communication pipe 34 in the first embodiment, but the present invention is not limited to this configuration. Similarly, the blow-by gas is discharged to the inside of the umbrella part 53 from the discharge port 61 of the column part 55 in the second embodiment, but the present invention is not limited to this configuration. The discharge port 36, 61 only needs to be projected to a side closer to the bottom than to the umbrella part 32, 53 of the air funnel 29, 51. Therefore, the discharge port 36, 61 may not be located on the inside of the umbrella part 32, 53 or not located directly under the umbrella part 32, 53.

Further, the umbrella parts 53 of the air funnels 51 and the column part 55 are integrally formed in the second embodiment, but the present invention is not limited to this configuration. The umbrella parts 53 of the air funnels 51 and the column part 55 may be separately formed.

Further, the column part 55 is arranged on the rear side of the air funnels 51 to discharge the blow-by gas to the filter 47 side after passing between the pair of air funnels 51 in the second embodiment, but the present invention is not limited to this configuration. The column part 55 may be arranged on the front side of the air funnels 51 to discharge the blow-by gas toward the filter 47.

Further, the multi-cylinder engines are exemplified in the first and second embodiments, the present invention is not limited to these configurations. The present invention is also applicable to a single-cylinder engine.

According to the reflux structure for blow-by gas of the present invention, it is possible to appropriately adjust the concentration of the blow-by gas in the intake air and reflux the blow-by gas without decreasing the engine power by discharging the blow-by gas to a side closer to the bottom than to the umbrella part around the air funnel.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

As described above, the present invention provides an effect to be able to appropriately adjust the concentration of the blow-by gas in the intake air and reflux the blow-by gas without decreasing the engine power, and is useful, in particular, for the reflux structure for blow-by gas in the multi-cylinder engine.

What is claimed is:

1. A reflux structure for blow-by gas that returns blow-by gas generated in an engine to a clean side of an air cleaner to reflux the blow-by gas to the engine, said reflux structure for blow-by gas comprising:

a pipe that has a flow path introducing the blow-by gas from the engine to the clean side of the air cleaner; and an air funnel that is mounted on the clean side of the air cleaner and introduces intake air from a dirty side into the engine, wherein said pipe has a discharge port formed to discharge the blow-by gas to a side closer to a bottom than to an umbrella part of the air funnel around the air funnel, wherein the discharge port is located directly under the umbrella part, and wherein the blow-by gas, after being diffused inside the umbrella part, flows around and expands from the inside to an outside of the umbrella part, and is drawn into an intake flow in the vicinity of a suction port and then refluxed into the engine.

2. The reflux structure for blow-by gas according to claim 1, wherein the umbrella part of the air funnel has a shape turnover from a tip side of a cylindrical funnel body to be opposed to an outer peripheral surface of the funnel body, and wherein the discharge port of said pipe is positioned on an inside of the umbrella part to be covered with the umbrella part of the air funnel.

3. The reflux structure for blow-by gas according to claim 2, wherein the engine is a multi-cylinder engine that includes the air cleaner having a plurality of the air funnels, and wherein said pipe is disposed between adjacent ones of the air funnels.

4. The reflux structure for blow-by gas according to claim 3, wherein in the air cleaner, a fuel injection device is provided on an upper surface opposed to a mounting surface for the air funnel, wherein said pipe is composed of a breather pipe that connects the engine and the air cleaner, and a hollow column part that continues to the breather pipe and connects the mounting surface and the upper surface of the air cleaner, and wherein the fuel injection device is fixed to a tip part of the column part.

5. The reflux structure for blow-by gas according to claim 4, wherein in the air cleaner, a filter that separates the clean side and the dirty side is mounted on a front side, and the plurality of air funnels are mounted on a rear side, and wherein the column part is mounted on a rear side of the air funnel, and has the discharge port formed to discharge the blow-by gas between the adjacent air funnels.

* * * * *